United States Patent [19]
Cloud

[11] Patent Number: 5,845,114
[45] Date of Patent: Dec. 1, 1998

[54] PC CARD INITIALIZATION FOR MICROPROCESSOR BASED DEVICES

[75] Inventor: Steven M. Cloud, Stow, Ohio

[73] Assignee: Telxon Corporation, Akron, Ohio

[21] Appl. No.: 779,809

[22] Filed: Jan. 8, 1997

[51] Int. Cl.$^6$ ...................................................... G06F 9/06
[52] U.S. Cl. ............................................................ 395/651
[58] Field of Search ..................... 395/651, 652, 395/653, 712, 828, 830, 833, 834

[56] References Cited

U.S. PATENT DOCUMENTS

| | | | |
|---|---|---|---|
| 5,491,804 | 2/1996 | Heath et al. ............................ | 395/652 |
| 5,537,597 | 7/1996 | Samdage ................................. | 395/652 |
| 5,664,198 | 9/1997 | Chen et al. ............................. | 395/652 |
| 5,701,478 | 12/1997 | Chen ...................................... | 395/652 |

*Primary Examiner*—Kevin A. Kriess
*Attorney, Agent, or Firm*—Renner, Otto, Boisselle & Sklar, P.L.L.

[57] ABSTRACT

An electronic device including a microprocessor which executes code for carrying out a predefined set of operations; a non-volatile memory for storing code accessed by the microprocessor in order for the microprocessor to carry out the predefined set of operations; a PC Card slot coupled to the microprocessor; and a control circuit for, when the device is in an initialization state, providing for code stored in a PC Card inserted in the PC Card slot to be written to the non-volatile memory by the microprocessor.

14 Claims, 4 Drawing Sheets

PC CARD INITIALIZATION FOR MICROPROCESSOR BASED DEVICES

TECHNICAL FIELD

The present invention relates generally to microprocessor based electronic devices, and more particularly to microprocessor based devices capable of executing code from a PC Card type (e.g., PCMCIA) peripheral device.

BACKGROUND OF THE INVENTION

A wide variety of different types of microprocessor based devices are available today with new types continuously being developed. For example, there are numerous different hand held devices such as calculators, personal organizers, personal digital assistants (PDAs), notebook computers, etc. In addition, larger devices exist such as desktop personal computers, computerized appliances, video tape recorders (VTRs), etc.

In order for many microprocessor based devices to operate properly, it is necessary to store executable code in a non-volatile memory included within the device. For example, the microprocessor within each device accesses the code as part of its initial boot up procedure upon being powered up or reset. The initialization process has come to be known as a "GENESIS". Generally speaking, code used during the initialization process represents a software program customized to the particular application of the microprocessor within the device. The genesis process typically relates to the procedure of placing the code into non-volatile memory associated with the microprocessor based device.

Currently known techniques for conducting the genesis process involve the need for a special genesis card to be attached to a printed circuit board within the microprocessor based device during its initial assembly. The genesis card has stored therein the genesis program or serves as an interface between the device and an external device which supplies the genesis program. The genesis card itself can be relatively large and may include one or more large connectors (e.g., two 72-pin connectors) for providing the necessary data and addressing bits and control signals to the microprocessor based device during the genesis process. In addition, of course, the printed circuit board within the device must have corresponding connectors to mate with the genesis card.

During the assembly process, an assembler would physically connect the genesis card to the printed circuit board of the microprocessor via the respective connectors. The microprocessor within the device would then execute the program from the genesis card and store it temporarily in dynamic random access memory (DRAM). Thereafter, the microprocessor would store the program from the DRAM into the non-volatile memory. If the non-volatile memory were to subsequently need reprogramming, the device would have to be disassembled so a new genesis card could be connected and a new genesis program be loaded into the non-volatile memory.

Unfortunately, the procedure of connecting a genesis card to a microprocessor based device in order to load the program is extremely cumbersome. Workers oftentimes bend or break connector pins and/or try to force the genesis card into the printed circuit board connectors with the wrong orientation. Moreover, the connectors required by the device for receiving the genesis board take up valuable space on the device printed circuit board, thus limiting the amount by which the device can be miniaturized. Furthermore, if it is necessary to update/replace the program on the genesis card, the microprocessor based device must be disassembled so that a new genesis card can be attached. This results in significant additional labor and associated costs. Moreover, such procedure can be performed reliably only by a qualified technician. Consequently, a user must give up the device for a significant period of time resulting in user dissatisfaction, etc.

In view of the aforementioned shortcomings associated with the genesis process, there is a strong need in the art for a system which avoids the difficulties and hardships discussed above. There is a strong need for a system which does not require separate connectors for connecting a genesis card. Moreover, there is a strong need in the art for a system that allows a user to reprogram/reconfigure the non-volatile memory without the need for a qualified technician.

SUMMARY OF THE INVENTION

The present invention provides for a genesis process to be carried out through a standard PC Card slot (e.g., PCMCIA). More specifically, the code for a microprocessor based electronic device is initially stored in memory in a standard PCMCIA card. The card is placed into a standard PC Card slot ordinarily included in the electronic device for use with various types of known PCMCIA peripherals and add-ons available to the user. The device is placed into an initialization mode via a switch or other input control. The device then proceeds to download the initialization code from the PCMCIA card where it is stored temporarily in DRAM prior to being loaded into non-volatile memory within the device.

Since the PC Card slot is already present within the device there is no need for extra connectors for connecting a genesis card as in the prior art.

This reduces the overall size of the device. Also, because most ordinary users are familiar with the use of PC Card peripherals, users can easily be relied upon to perform their own genesis process without the help of a qualified technician.

According to one aspect of the present invention, an electronic device, comprising: a microprocessor which executes code for carrying out a predefined set of operations; a PC Card slot coupled to the microprocessor; and a control circuit for, when the device is in a genesis state, providing for code stored in a PC Card inserted in the PC Card slot to be executed.

In accordance with another aspect of the present invention, a method of copying code from a PC Card to a device, the device comprising a microprocessor, a non-volatile memory for storing code accessed by the microprocessor, a PC Card slot coupled to the microprocessor and a control circuit for, when the device is in a genesis state, providing for code stored in the PC Card inserted in the PC Card slot to be executed, the method comprising the steps of: placing the device in a genesis state; inserting the PC Card into the PC Card slot of the device, the PC Card including code for carrying out a predefined set of operations; and initiating a system reset, whereby code stored on the PC Card is executed by the microprocessor in accordance with the predefined set of operations.

According to yet another aspect of the present invention, an electronic device, comprising: a microprocessor which executes code for carrying out a prescribed set of operations; a non-volatile memory for storing initialization code accessed by the microprocessor in order to initialize the microprocessor to carry out the prescribed set of operations; a PC Card slot coupled to the microprocessor; and a control circuit for, when the device is in an initialization state, providing for initialization code stored in a PC Card inserted in the PC Card slot to be written to the non-volatile memory by the microprocessor.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
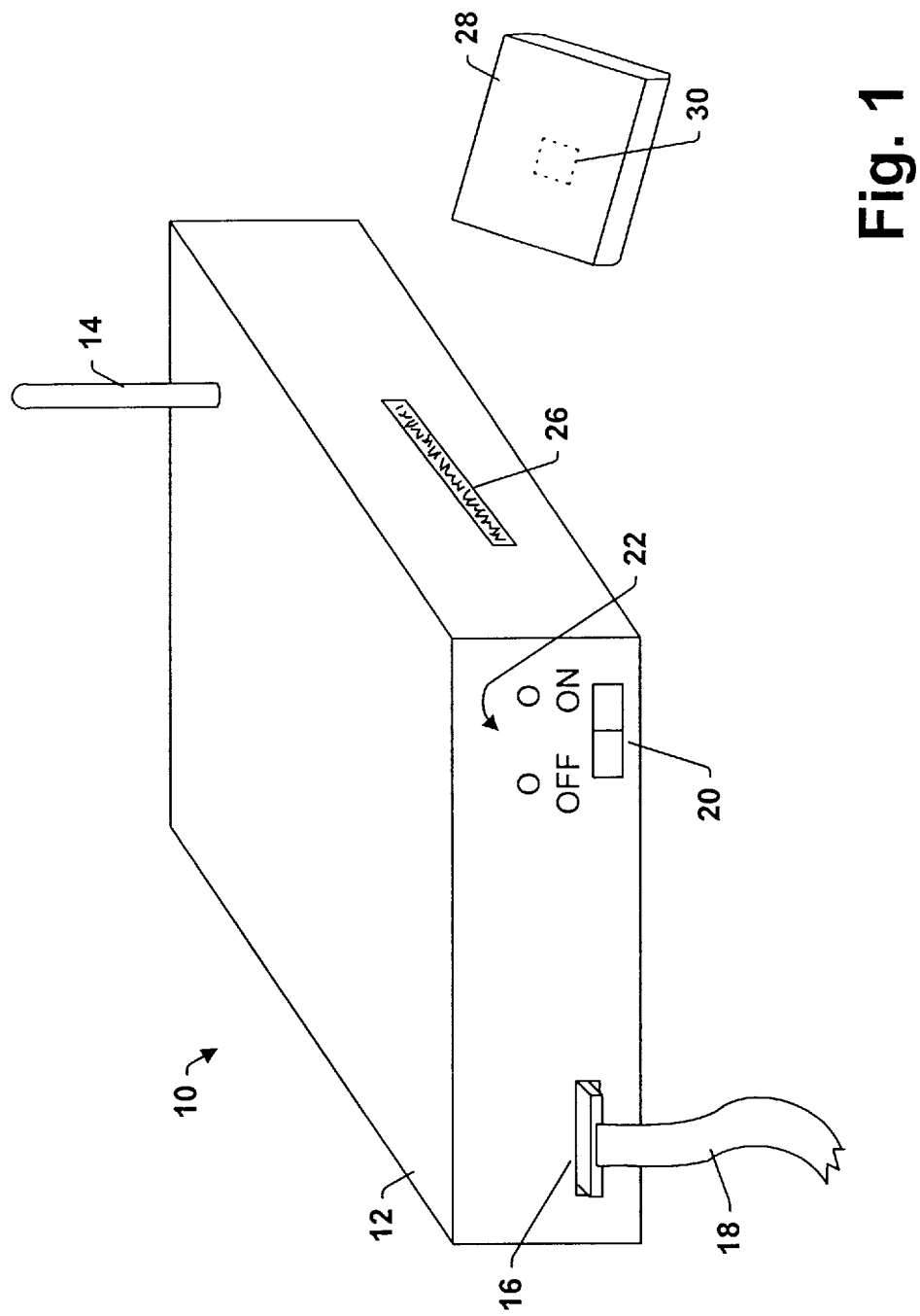
FIG. 1 is a perspective view of a microprocessor based electronic device in accordance with the present invention.

The present invention will now be described in detail with reference to the drawings, wherein like reference numerals are used to refer to like elements throughout.

Referring initially to FIG. 1, a microprocessor based electronic device 10 is shown. In the exemplary embodiment, the electronic device 10 is an access point for use in a wireless communications network. As is known, access points serve as a link between one or more mobile terminals in a wireless communications network and a hardwired system backbone. Mobile terminals communicate with the access points via radio frequency (RF) or optical signals.

In addition, the access points can communicate directly via hardwired communications with other devices on the system backbone. As a result, mobile terminals are able to communicate with other devices on the system backbone via the access points. Nevertheless, it will be appreciated that the present invention has utility in any electronic device which requires code, or programs to be loaded into non-volatile memory.

Figure 2:
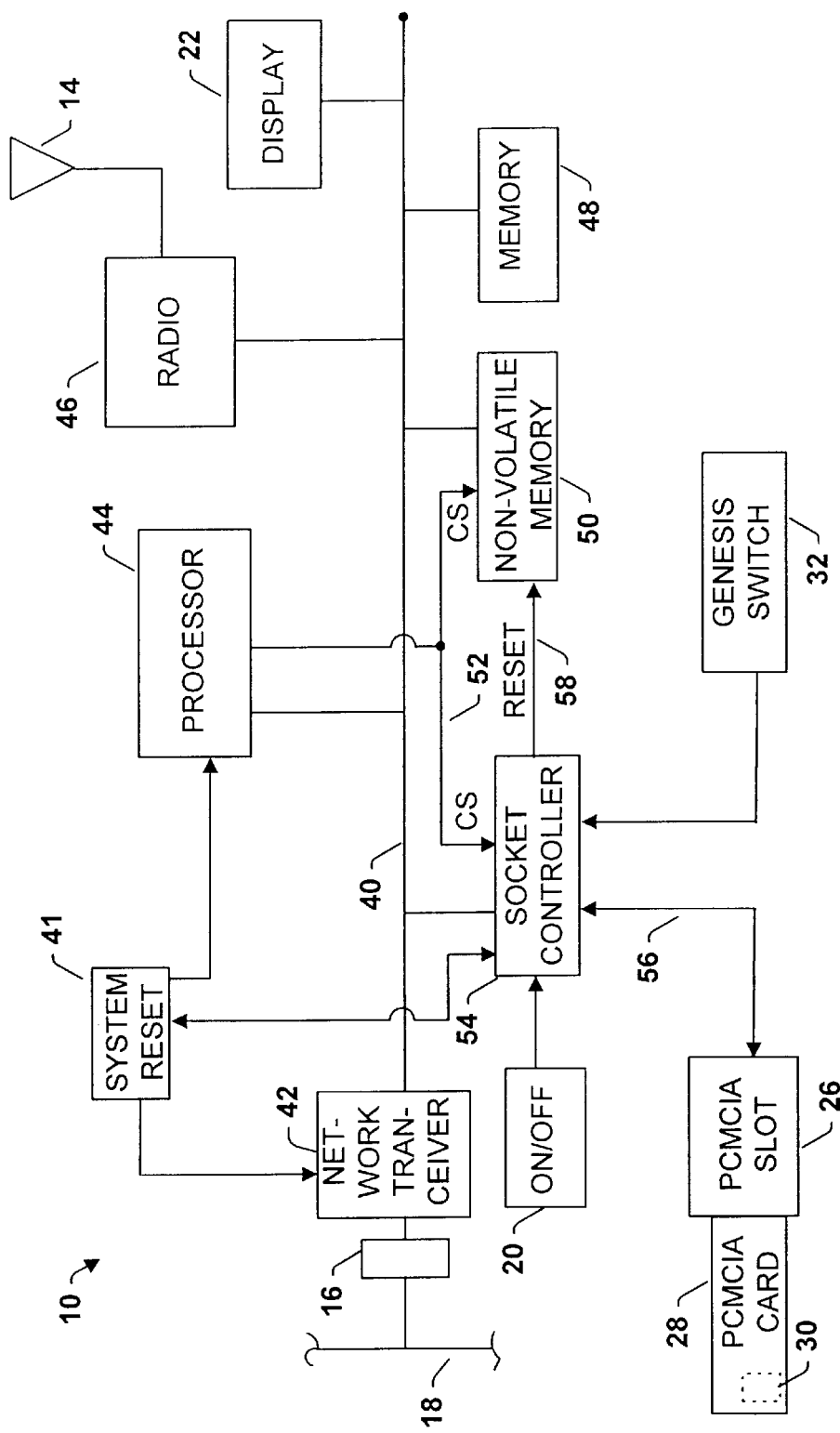
FIG. 2 is a block diagram of the electronic device in accordance with the present invention.

As is shown in FIG. 1, the device 10 includes a housing 12 for protecting the various electronic components stored therein (see FIG. 2). Extending from the housing 12 is an antenna 14 for transmitting and receiving RF signals transmitted from/received by the device 10. The device 10 further includes a connector 16 exposed on a face of the housing 12 for allowing the device 10 to be connected directly to a system backbone 18 included within a wireless communications network, for example. An ON/OFF switch 20, which is also exposed on a face of the housing, determines whether or not electrical power is applied to the electronic components within the device 10. The ON/OFF switch 20 can be any type of two-position switch such as a toggle switch or rocker switch as will be readily appreciated. Located above the ON/OFF switch 20 is a pair of light emitting diodes (LEDs) constituting a display 22. One of the LEDs is designed to emit light in the case where there is RF activity, such as the transmission or receipt of wireless communication, and the other LED is designed to emit light when there is network activity between the device 10 and the system backbone 18.

The device 10 also includes a standard PC Card slot 26 exposed on a face of the housing 12 for receiving a standard PC Card type peripheral device or add-on. As is conventional, such PC Card slots 26 may also be provided internal to the housing 12 to better avoid users interfering with them on a day to day basis. As are well known in the art, a variety of PC Card peripherals are available which conform to one or more of the various standards. For example, there are several PCMCIA type standards and peripherals. Each of these type standards and peripherals can be referred to generally as a PC Card as they have a generally credit card shape with a standardized connector which allows the PC Cards to be utilized as a user peripheral device. The PC Cards, generally represented by a PC Card 28 in FIG. 1, are designed to be received by a corresponding PC Card slot such as the PC Card slot 26. The PC Card slot 26 provides an appropriate electrical connection between the electronics found within the PC Card 28 and the electronic components within the device 10 as is well known. The PC Card 28 in normal operation can provide any of a variety of known functions such as fax/modem utilities, external hard drive connection, additional memory, etc. Different PC Cards 28 typically perform different functions. By simply plugging in the appropriate PC Card 28 into the PC Card slot 26, the capabilities of the device 10 can be expanded.

According to the present invention, however, the PC Card slot 26 also serves as a means for carrying out the aforementioned genesis process for the device 10. More specifically, a given PC Card 28 is designed to provide a desired code, ie., an initialization program, to the device 10 via the PC Card slot 26. The PC Card 28 includes a non-volatile memory 30 (shown in phantom) such as an EPROM, EEPROM, flash memory, battery backed SRAM etc., which has prestored therein code which is desired to be copied into the device 10. Such code can be developed according to conventional techniques and stored in the non-volatile memory 30 based on known techniques. The code may represent the original application program for the newly assembled device 10, or may rather represent an update or reconfiguration to be implemented by the user of the device 10.

The device 10 further includes a "genesis" switch 32 located in the interior of the housing 12 (FIG. 2). The switch 32 preferably is a two position switch which determines whether the device is in a normal operating state or is in a genesis state (also referred to as an initialization state) for carrying out the genesis process or other process of executing code and/or reading or writing to memory on the PC Card 28 inserted in PC Card slot 26. In particular, when the switch 32 is "OFF" the device 10 functions according to its normal intended purpose. The PC Card slot 26 during such time serves as a conventional means for attaching a peripheral device in the form of a PC Card 28. As mentioned above, the PC Card 28 can serve such functions as a fax/modem, extended memory, etc. On the other hand, when the switch 32 is "ON" the device 10 is informed that a PC Card 28 having code stored therein is to be inserted in the PC Card slot 26. The device 10 then goes through its own genesis process whereby the code in the PC Card 28 is executed and copied into non-volatile memory within the device 10. Significantly different from existing devices which operate in a mode representative of when the switch 32 is "OFF", no program or code needs to be pre-existing to the devices memory (i.e. memory 41, non-volatile memory 50) in order for the microprocessor 44 to execute the code on the PC Card 28 when the switch 32 is "ON" (i.e., representative of the genesis state). When the switch 32 is "OFF", there must be at least some code for the processor 44 to execute in order to control when information is to be read or written to or from the PC Card 28. However, as is discussed in more detail below, the present invention provides for a genesis state which allows a device 10 which is completely void of any code or programs to execute and copy code stored on the PC Card thereby eliminating the need for the special genesis card and connectors as discussed in the background section. Of course, such code stored on the PC card may also be executed in the genesis state even if there are code or programs stored in the device's memory (i.e., memory 50). The switch 32 can be any type of switch, for example, such as a toggle, slide, rocker, or other type of switch or device which can perform this on/of function.

Turning now to FIG. 2, a detailed block diagram of the device 10 is shown. As mentioned above, the device 10 is connected to the system backbone 18 via the connector 16. The device 10 includes a main address/data bus 40 which is connected to the system backbone 18 via a conventionally known network transceiver 42. The transceiver 42 provides the appropriate interface between the device 10 and the system backbone 18 to allow for communications between the device 10 and other devices on the system backbone 18. The device 10 further includes a microprocessor 44 connected to the bus 40. The microprocessor 44 is responsible for primary control and execution of a variety of functions of the device 10 as is conventional. The microprocessor 44 executes program code, processes data, controls various other components within the device 10, etc. The particular functions of the microprocessor 44 and the program code generally executed by the microprocessor 44 are not germane to the present invention, and hence detail has been omitted. Such features will depend largely on the application of the device 10, whether it be as an access point, mobile terminal, or any other type of electronic device. It is, however, the microprocessor 44 which utilizes the code provided during the genesis process in accordance with the present invention and which is significant.

The device 10 in the exemplary embodiment also includes a radio section 46 for transmitting and receiving information from mobile terminals or other access points via an RF carrier. Specifically, data which is to be transmitted is provided to the radio section 46 from the microprocessor 44 via the bus 40. Data which is received by the radio section 46 is provided to the microprocessor 44 via the bus 40. The radio section 46 transmits and receives radio signals via the antenna 14. The display 22 is connected to the bus 40 as shown.

The device 10 further includes a volatile memory 48 connected to the bus 40. The memory 48 is used as operating memory for carrying out the various functions of the device 10. Such memory 48 can be any of a variety of different types of memory, and is most preferably dynamic random access memory (DRAM). In addition, the device 10 includes a non-volatile memory 50 connected to the bus 40 for storing, among other things, the initialization code for the device 10. The memory 50 can be any of a variety of different types of non-volatile memory, but most preferably is electrically erasable programmable read only memory (EEPROM) or what is referred to as flash read only memory (flash ROM). The memory 50 includes a chip select (CS) input which, when active, enables the memory 50 to be accessed/written to by the microprocessor 44. The microprocessor 44 provides a CS signal to the memory 50 via line 52 as shown in FIG. 2. As is conventional, the CS signal on line 52 goes active whenever the microprocessor 44 accesses the non-volatile memory 50. This causes the memory 50 to be selected initially such that the code stored therein can be accessed by the microprocessor 44 via the bus 40. The microprocessor 44 can then carry out its ordinary boot-up routine or other functions as specified by the code.

The device 10 additionally includes a socket controller 54 connected to the bus 40, and a PCMCIA bus 56 between the socket controller 54 and the PC Card slot 26. As is conventional, the socket controller 54 serves as an interface between communications on the PCMCIA bus 56 and communications on the main bus 40. A system reset 41 is shown connected to the network transceiver 42, socket controller 54 and processor 44. The system reset may be transitioned from an inactive to an active state based on the on/off switch being switched "on" or by other various software controlled system resets, for example.

The socket controller 54 receives as inputs information relating to the state of the system reset and position of the genesis switch 32. Moreover, the socket controller 54 receives as an input the CS signal on line 52 as provided by the microprocessor 44. The socket controller 54 provides as an output a reset signal on line 58. The reset signal on line 58 is input to a reset input of the memory 50. When the reset signal on line 58 is active, the memory 50 is disabled regardless of the status of the CS signal input to the memory 50 as will be appreciated.

Figure 3:
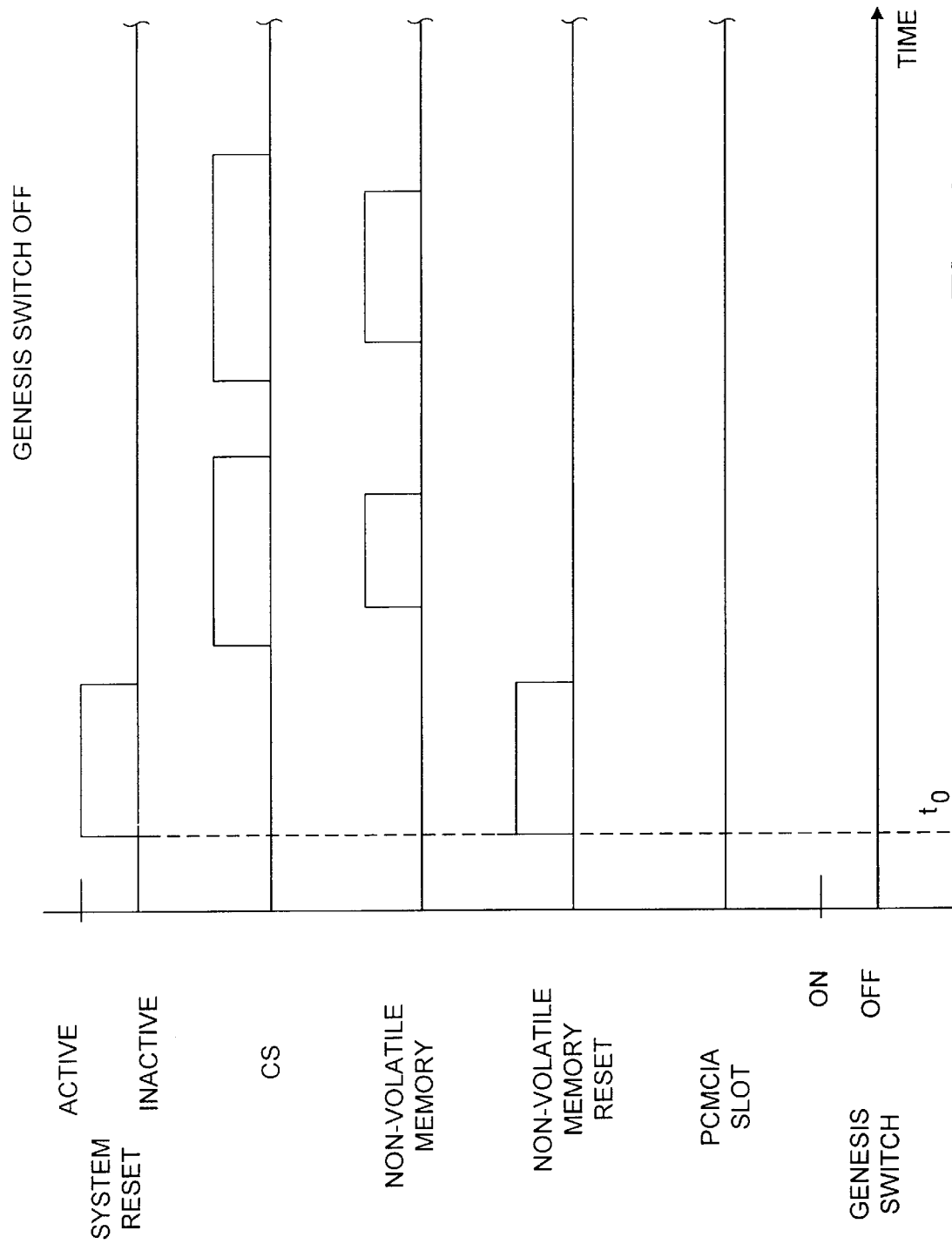
FIG. 3 is a timing diagram representing operations of the electronic device functioning in a normal operating mode following a system reset in accordance with the present invention.

FIG. 3 is a timing diagram representing normal operations of the device 10 when the genesis switch is in an "off" position and following a system reset wherein the system reset 41 transitions from an inactive to an active state. It is assumed that code such as the initialization code for the microprocessor 44 has already been stored in the non-volatile memory 50, and hence the device 10 is undergoing a typical start-up. The PC Card 28 with the initialization code stored in memory 30 would not be present in the PC Card slot 26, although some other PC Card 28 may in fact be present as will be appreciated. The system reset 41 transitions from an inactive to an active state at time $t_0$ as shown in FIG. 3. Prior to time $t_0$, the genesis switch 32 is maintained or placed in the "OFF" position by the user. At time $t_0$, the microprocessor 44 proceeds with its customary reset operations. As shown, the system reset 41 only remains active for a time period long enough to begin the reset operations and then goes back to an inactive state although the reset operations continue until all routines are completed by the microprocessor 44. Thus, following the reset active state, the microprocessor 44 will periodically assert the CS signal on line 52 as shown whenever it may be necessary to read or write to the non-volatile memory 50. During such time following the system reset active period, the socket controller 54 keeps the reset signal on line 58 deactivated. As a result, the memory 50 is enabled and is available to be read or wrote to within the time periods of which the CS is asserted via the bus 50.

Figure 4:
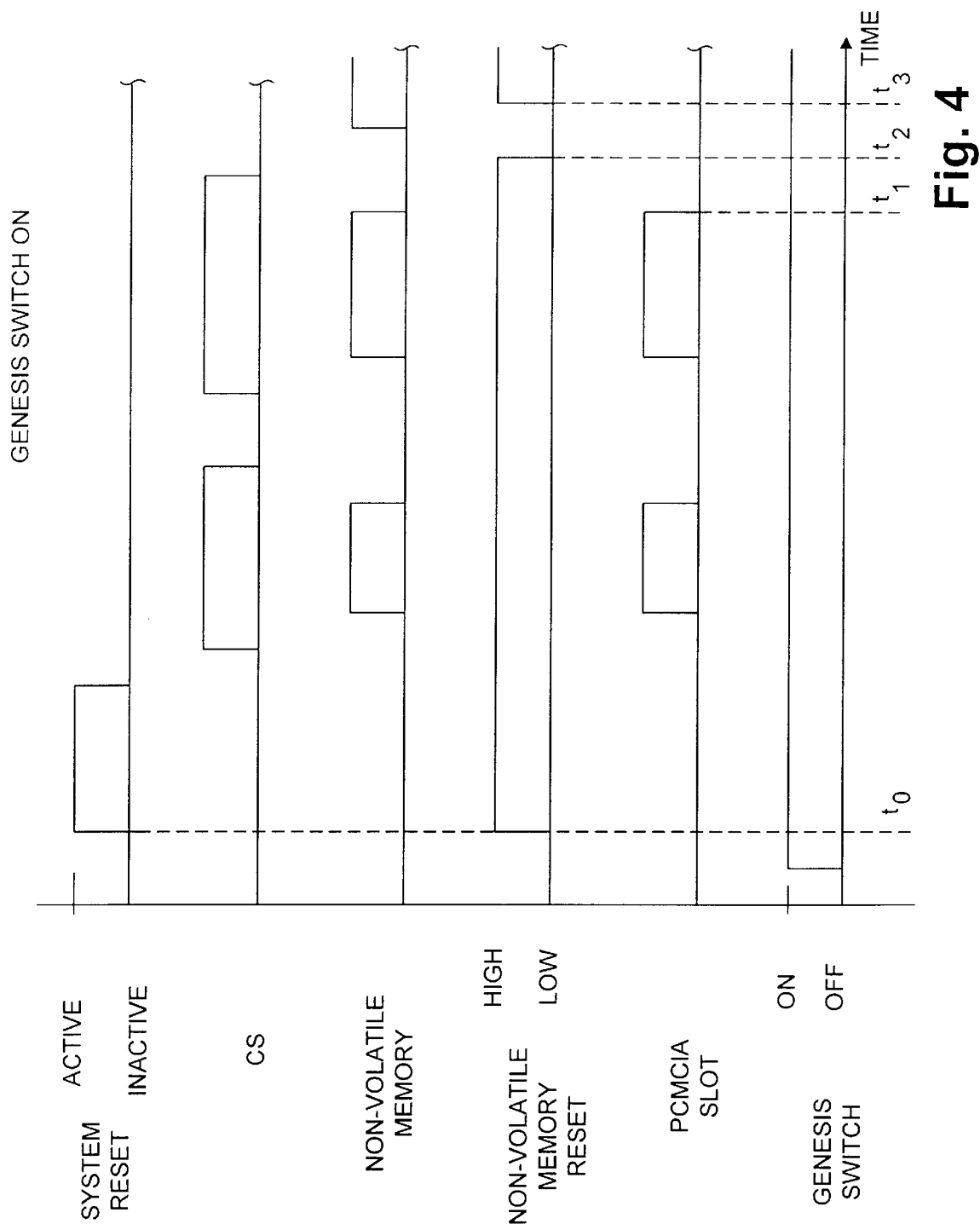
FIG. 4 is a timing diagram representing operations of the electronic device functioning in a genesis state following a system reset accordance with the present invention.

FIG. 4 is a timing diagram representing the operations of the device 10 when the genesis switch is placed in the "ON" position thereby indicating the device 10 is in a genesis state. In such case, the PC Card 28 having code such as the initialization code stored in memory 30 has been inserted in the PC Card slot 25 as shown in FIG. 2. Again the system reset is transitioned from an inactive to an active state at time to. However, prior $t_0$ time to the user or technician changes, if necessary, the state of the genesis switch 332 from "OFF" to "ON". As in the case shown in FIG. 3, following the active rest period, the microprocessor 44 proceeds with its conventional reset routine which includes periodically asserting and deasserting the CS.

Substantially immediately following the position of the genesis switch 32 being in the "ON" position, the socket controller 54 asserts the non-volatile memory reset signal on line 58. This has the effect of disabling the memory 50 at time $t_0$ such that any code which may have been stored in the memory 50 cannot be read or wrote to via the bus 40. Thus, even though the non-volatile memory read/write signal is shown to be asserted during such times as the CS is asserted, no transactions take place between the microprocessor 44 and the memory 50 since the non-volatile memory reset is asserted. This leaves the bus 40 free to read, write, and/or execute code stored in the memory 30 of the PC Card 28. For example, using conventional PC Card memory access techniques the socket controller 54 may be used to cause the code in the PC Card to be downloaded onto the PCMCIA bus 56 and hence onto the bus 40. The code is thereby available to the microprocessor 44.

In the event the code obtained from the PC Card 28 is to be stored in non-volatile memory, the code itself will instruct the microprocessor 44 to load a pertinent portion of the code temporarily into DRAM memory 48, and thereafter permanently store the code in the non-volatile memory 50. Thus, during the period between time $t_0$ and time $t_1$ when the CS is asserted the code, in this example, is read from the PC Card 28 via the PC Card slot 26 and is stored in the memory 48. At time $t_2$ (following $t_1$), the socket controller 54 deasserts the reset signal on line 58 so as to enable the non-volatile memory 50. Then, at any time after time $t_2$ when the CS is asserted, the microprocessor may proceed to write the code temporarily stored in memory 48 to the non-volatile memory 50 as is being done at time $t_3$. In this manner, even without having any code conventionally needed to load programs from a PC Card stored in the device 10, the code from a PC Card 28 can be copied into the device 10 simply by inserting the PC Card 28 into the slot 26 and switching the genesis switch 32 to the "ON" position.

The time period between times $t_0$ and time $t_2$ preferably is preset so as to be the maximum expected time for the microprocessor 44 to obtain the code from the PC Card 28 and temporarily store the code in the memory 48. Alternatively, a protocol may be established between the socket controller 54 and the microprocessor 44 whereby the microprocessor 44 instructs the socket controller 54 to deassert the reset signal on line 58 after retrieving the code from the PC Card 28. The microprocessor 44 is in turn programmed to wait at least until after time $t_2$ (i.e., until time $t_3$) before proceeding to write the code stored in the memory 48 to the non-volatile memory 50.

The socket controller 54 has a conventional construction with the exception of a logic gate array for carrying out the above-described logic operations involving its various inputs and outputs. The socket controller 54 could be built into an ASIC for example.

Although the invention has been shown and described with respect to certain preferred embodiments, it is obvious that equivalents and modifications will occur to others skilled in the art upon the reading and understanding of the specification. For example, the device 10 may be some type of electronic device other than an access point such as a mobile terminal. A mobile terminal would have substantially the same construction and operation as the device 10 described above except for the connection to the system backbone. The present invention includes all such equivalents and modifications, and is limited only by the scope of the following claims.

What is claimed is:

1. An electronic device, comprising:
   a microprocessor which executes code for carrying out a predefined set of operations;
   a PC Card slot coupled to the microprocessor; and
   a control circuit for, when the device is in a genesis state, providing for code stored in a PC Card inserted in the PC Card slot to be executed.

2. The device of claim 1 further comprising a non-volatile memory for storing code accessed by the microprocessor in order for the microprocessor to carry out the predefined set of operations.

3. The device of claim 1, wherein when the device is in a normal state, a PC Card inserted in the PC Card slot serves as a peripheral device during the predefined set of operations.

4. The device of claim 3, wherein the state of the device is controlled by a user switch.

5. The device of claim 1, wherein the genesis state is defined by the position of a switch.

6. The device of claim 2, wherein the control circuit includes a socket controller which serves as an interface between the PC Card slot and a system bus connected to the microprocessor.

7. The device of claim 6, wherein the socket controller issues a control signal to disable the non-volatile memory at least initially when the device is in a genesis state.

8. A method of copying code from a PC Card to a device, the device comprising a microprocessor, a non-volatile memory for storing code accessed by the microprocessor, a PC Card slot coupled to the microprocessor and a control circuit for, when the device is in a genesis state, providing for code stored in the PC Card inserted in the PC Card slot to be executed, the method comprising the steps of:
   placing the device in a genesis state;
   inserting the PC Card into the PC Card slot of the device, the PC Card including code for carrying out a predefined set of operations; and
   initiating a system reset, wherein code stored on the PC Card is executed by the microprocessor in accordance with the predefined set of operations.

9. The method of claim 8, wherein the event the device is placed into a normal state, then upon initiating a system reset, the microprocessor executes code stored in the non-volatile memory.

10. An electronic device, comprising:
    a microprocessor which executes code for carrying out a prescribed set of operations;
    a non-volatile memory for storing initialization code accessed by the microprocessor in order to initialize the microprocessor to carry out the prescribed set of operations;
    a PC Card slot coupled to the microprocessor; and
    a control circuit for, when the device is in an initialization state, providing for initialization code stored in a PC Card inserted in the PC Card slot to be written to the non-volatile memory by the microprocessor.

11. The device of claim 10, wherein when the device is in a normal state, a PC Card inserted in the PC Card slot serves as a peripheral device during the prescribed set of operations.

12. The device of claim 11, wherein the state of the device is controlled by a user switch.

13. The device of claim 10, wherein the control circuit includes a socket controller which serves as an interface between the PC Card slot and a system bus connected to the microprocessor.

14. The device of claim 13, wherein the socket controller issues a control signal to disable the non-volatile memory at least initially when the device is in an initialization state.

* * * * *